United States Patent

[11] 3,562,551

[72] Inventor Franklin H. Fowler, Jr.
Fullerton, Calif.
[21] Appl. No. 669,317
[22] Filed Sept. 20, 1967
[45] Patented Feb. 9, 1971
[73] Assignee the United States of America as represented by the Secretary of the Army. by mesne assignments

[54] UNIT DISTANCE COUNTER
5 Claims, 1 Drawing Fig.

[52] U.S. Cl. 307/220, 235/92; 307/223, 307/224; 328/37, 328/46
[51] Int. Cl. H03k 21/00
[50] Field of Search 307/220, 221, 223, 224; 328/37, 41, 46, 48, 55, 153; 235/92, 72, 90, 93, 95

[56] References Cited

UNITED STATES PATENTS

| | | | |
|---|---|---|---|
| 3,035,248 | 5/1962 | Grose et al. | 307/291X |
| 3,137,818 | 6/1964 | Clapper | 328/37X |
| 3,280,309 | 10/1966 | Villwock | 307/223X |
| 3,355,595 | 11/1967 | Penver | 235/92 |
| 3,370,237 | 2/1968 | Reiser | 328/46X |

*Primary Examiner*—Donald D. Forrer
*Assistant Examiner*—R. C. Woodbridge
*Attorneys*—Harry M. Saragovitz, Edward J. Kelly, Herbert Berl and Anthony T. Lane

ABSTRACT: A unit distance counter having ($n$−1) digit conventional counters, an $n$ digit register, and controls for changing the contents of the register when a count is sensed. The conventional counters and register are made up of flip-flop units.

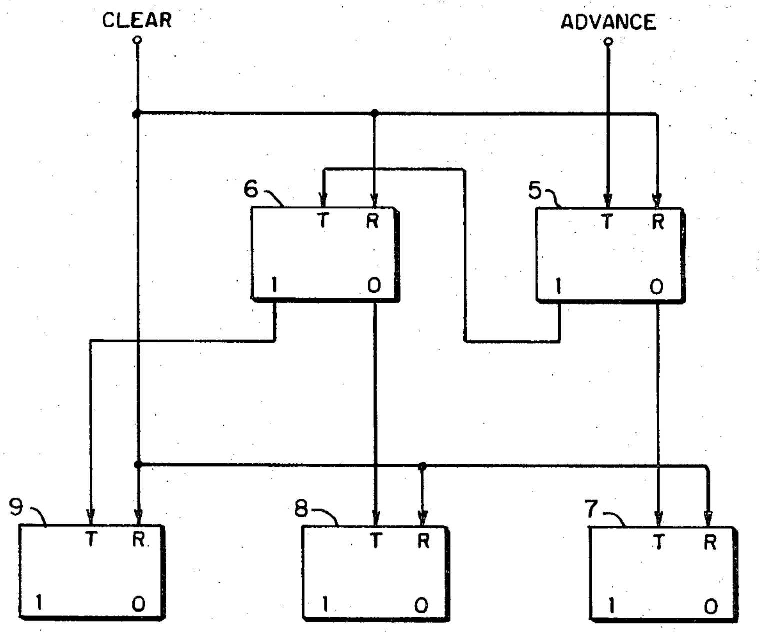
INVENTOR,
FRANKLIN H. FOWLER. JR.
BY Harry M. Saragovitz, Edward J. Kelly, Herbert Berl & Anthony T. Lane
ATTORNEYS.

UNIT DISTANCE COUNTER

BACKGROUND OF THE INVENTION

The present invention relates generally to counters and more particularly to a unit distance counter. A unit distance counter represents the number of events counted in a code in which only one digit is changed as the number of events increases by unit. In a conventional counter it is possible for more than one digit to change when an event is counted. When more than one digit changes, it is possible that some digits will change sooner than others. Thus spurious transient counter states arise as various digits change state before the others. For example, a conventional binary counter advanced from state 0111 would pass through the spurious transient states 0110, and 0100 before going into state 1000. In this case a system reading the conventional counter could interpret a count of 8 as a count of 4. A unit distance counter therefore has advantages in two classes of applications. In the first class the events being counted are not synchronized with the system reading the counter. In the second class, levels representing various numbers stored in the counter are used to initiate control actions, so that spurious transient counter states could initiate undesired actions. Prior art unit distance counters have had to rely on complicated gating systems which are both difficult to construct and subject to breakdown. The unit distance counter disclosed herein eliminates the need for such complicated gating structure and can be constructed of circuits similar to those which would be used in an electronic computing system in which this counter might be used.

SUMMARY

The invention basically includes two flip-flops connected as a conventional binary counter and a three digit register consisting of three further flip-flop circuits to advance the count stored in the register when an event is sensed. By using nothing but conventional flip-flop circuits in the manner shown, the need for complicated gating structure is eliminated.

DESCRIPTION OF DRAWING

The exact nature of this invention will be readily apparent from consideration of the following detailed description when considered with the drawing in which:

The FIG. shows a schematic view of the circuit of a preferred embodiment of the invention.

DESCRIPTION OF PREFERRED EMBODIMENT

Referring now to the drawing, there is shown in the FIG. flip-flop circuits 5, 6, 7, 8 and 9. When the flip-flops are in the "0" state, the "0" output has a positive voltage and the "1" output has a negative voltage. When a flip-flop is in the "1" state, the "0" output has a negative voltage and the "1" output has a positive voltage. The flip-flops are cleared to the zero state when a negative signal is received at input R. The flip-flop state is changed by a transition changed by a transition from 1 to 0 at input T. The register is formed by flip-flop units 7, 8 and 9. The rules for changing the digits of the register for a binary mod 8 counter are shown in Table I and may be stated as follows for an *n*-digit unit distance counter:

A. For the *n*-1 least significant digits, advance the value of the register digit whenever the corresponding counter digit is advanced but does not generate a carry.

B. Advance the value of the *n*th register digit whenever there is a carry from the (*n*-1) counter digit.

Assume now that a suitable negative signal has been applied so that conditions of row 0 of Table I are obtained. The events counted are those which cause the level of the "Advance" input to go from positive to negative. This change in level is applied to the "T" input of flip-flop 5, that flip-flop to change state.

Whenever flip-flop 5 changes from "1" to "0," the "1" output of that flip-flop goes from a positive to a negative level.

TABLE I

| | Counter contents binary | Register unit distance |
|---|---|---|
| Count: | | |
| 0 | 00 | 000 |
| 1 | 01 | 001 |
| 2 | 10 | 011 |
| 3 | 11 | 010 |
| 4 | 00 | 110 |
| 5 | 01 | 111 |
| 6 | 10 | 101 |
| 7 | 11 | 100 |
| 0 | 00 | 000 |

This change in level, applied to the T input of flip-flop 6 causes that flip-flop to change state. Thus flip-flop 5 and 6 behave as the binary counter in Table 1. Whenever the state of flip-flop 5 or 6 changes from "0" to "1," the level applied to the T input of flip-flop 7 or 8 changes from "0" to "1," the level applied to the T input of flip-flop 7 or 8 respectively will go from positive to negative. This will cause that flip-flop to change state. These changes of state of the register bits occur whenever there is a change of state in the corresponding counter bits but there is no carry from the corresponding counter bit.

Whenever the state of flip-flop 6 changes from "1" to "0," there is a carry from that counter stage, thus the "1" output of flip-flop 6 goes from a positive to a negative voltage causing the T input of flip-flop 9 to go negative. This causes flip-flop 9 to change state.

The changes of state of the register bits are therefore as follows:

1. Flip-flop 7 changes state whenever the units bit of the binary counter changes from state "0" to state "1."
2. Flip-flop 8 changes state whenever the two's bit of the binary counter changes from "0" to state "1."
3. Flip-flop 9 changes state whenever the two's bit of the binary counter changes from state "1" to state "0."

These actions are consistent with the rules stated above. The resulting register states are those given in normal operation, a suitable negative "clear" signal is applied to each of flip-flops 5,6,7, 8 and 9 so that each flip-flop is in the "0" state. Upon receipt of the first signal representing a counted event, as heretofore mentioned, flip-flop 5 changes to the "1" state as does flip-flop 7 as shown in Table I giving a 001 presentation at the unit distance counter or registers 9, 8, and 7 respectively. Upon receipt of a second counted signal, flip-flop 5 changes to the "0" state, flip-flop 7 is unaffected, and flip-flops 6 and 8 are switched to the "1" state, likewise shown in Table I as 011 on the unit distance counter composed of registers 9, 8 and 7 respectively. Upon receipt of a third counted signal, flip-flop 5 returns to the "1" state, flip-flop 7 returns to the "0" state, flip-flop 8 remains in the "1" state, flip-flop 9 remains in the "0" state, while flip-flop 6 remains in the "1" state.. Upon receipt of the fourth counted signal flip-flops 5 and 6 are switched to the "0" state while flip-flop 7 remains in the "0" state, flip-flop 8 remains in the "1" state and flip-flop 9 switches to the "1" state. Upon receipt of the fifth and subsequent counted events, like operations are performed as heretofore described in accordance with Table I and the rules for changing the digits of the binary counter composed of flip-flops 5, 6 and the rules for changing the digits of the unit distance counter comprising registers or flip-flops 7, 8, and 9.

This design is applicable to any number of bits. Additional counter bits could be inserted between flip-flops 5 and 6 and corresponding additional register bits could be inserted between flip-flops 7 and 8. The "0" output of each additional counter bit would be connected to the T input of the corresponding register bit.

It should be noted that a unit distance counter of this nature cannot be constructed for every possible modulus. For example, it is not possible to construct a unit distance binary counter of odd modulus. Each change of state of a unit distance binary counter is associated with exactly one change of state in one of the digits. Thus, in a unit distance counter of modulus $n$, the total number of states in all digits is $n$. Therefore, if $n$ is odd, at least one of the digits must undergo an odd number of changes of state. In the case of a binary counter, this would mean that the final state of at least one bit would be different from its initial state and hence that the counter would not return to its initial state after an odd number of counts. Therefore, if $n$ is odd, it cannot be the modulus of a unit distance binary counter.

However, it is possible to construct unit distance binary counters of even moduli other than powers of 2. For example, a unit distance binary counter of modulus 6 would follow the sequency of states shown in Table II. This is accomplished by a special control signal which forces the conventional binary counter into state 01 and the register into state 000. This special control signal is generated when the system is initialized and when the register advances from state 100.

TABLE II.—MOD 6 UNIT DISTANCE COUNTER

| | Binary counter state | Register state |
|---|---|---|
| Events counted: | | |
| 0 | 01 | 000 |
| 1 | 10 | 010 |
| 2 | 11 | 011 |
| 3 | 00 | 111 |
| 4 | 01 | 110 |
| 5 | 10 | 100 |
| 0 | 01 | 000 |

The implementation of unit distance counters of mechanical and other suitable constructions and modes of operation in accordance with the rules stated above should be obvious to those skilled in the arts associated with those constructions and modes of operation. In many instances, such counters would be of some radix other than two.

The use of binary coded digits of radix greater than two is also possible. As an example, consider a unit distance binary coded decimal counter. Here, the individual decimal digits would themselves be mod 10 unit distance binary counters. Similarly, in the general case of a binary coded radix $n$unit distance counter, the individual digits would be mod $n$unit distance binary counters. Therefore, since unit distance binary counters of odd radix are impossible, only unit distance binary coded counters of even radix can be constructed.

It should be understood, of course, that many modifications and variations of the present invention are possible in light of the above teachings and that such modifications may be made without departing from the spirit and the scope of the invention as set forth in the appended claims.

I claim:

1. A unit distance counter, comprising:
an $n$—1 digit conventional counter for counting a series of events;
an $n$ digit register; and
means connecting said counter and said register for changing the contents of said register, whenever a counted event is sensed, in such a manner that no more than one digit will change for each event sensed in accordance with the following rules:
Advance the register digit whenever the counter digit is advanced but does not generate a carry;
Advance the value of the $n$th registor digit wherever there is a carry from the $n$—1 counter.

2. A unit distance counter, comprising:
a binary counter for counting a series of events;
a register capable of storing three digits; and
means connecting said counter and said register for changing the contents of said register whenever a counted event is sensed, in such a manner that no more than one digit will change for each event sensed in accordance with the following rules:
Advance the register digit whenever the counter digit is advanced but does not generate a carry;
Advance the value of the $n$th register digit wherever there is a carry from the $n$—1 counter.

3. The apparatus as recited in claim 2 in which:
said binary counter comprises two flip-flop units;
said register comprises three flip-flop units; and
said means for changing the contents comprises means to apply an electrical signal to the binary counter.

4. The apparatus as recited in claim 3 further including; means to simultaneously clear all said flip-flop units thereby setting them in a "zero" condition.

5. A unit distance counter comprising:
a first, second, third, fourth and fifth flip-flop circuit each having at least one input and two output states; such that the first output of the first flip-flop is connected to the input of the third flip-flop,
the second output of the first flip-flop is connected to the second flip-flop input,
the first output of the second flip-flop is connected to the input of the fourth flip-flop,
the second output of the second flip-flop is connected to the input of the fifth flip-flop; and
a signal supplied to the input of the first flip-flop to thereby cause said unit distance counter to change by only one digit as an event is counted.